(12) United States Patent
Dangberg et al.

(10) Patent No.: US 8,073,846 B2
(45) Date of Patent: Dec. 6, 2011

(54) CONTROL METHOD FOR DISPOSING GRAPHICAL ELEMENTS

(75) Inventors: Andreas Dangberg, Paderborn (DE); Wolfgang Müller, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 1012 days.

(21) Appl. No.: 10/451,986

(22) PCT Filed: Dec. 21, 2001

(86) PCT No.: PCT/DE01/04883
§ 371 (c)(1),
(2), (4) Date: Dec. 1, 2003

(87) PCT Pub. No.: WO02/054282
PCT Pub. Date: Jul. 11, 2002

(65) Prior Publication Data
US 2004/0090456 A1    May 13, 2004

(30) Foreign Application Priority Data
Dec. 31, 2000   (DE) .................... 100 65 323

(51) Int. Cl.
G06F 7/00    (2006.01)
G06F 17/30    (2006.01)

(52) U.S. Cl. .................... 707/724; 707/722

(58) Field of Classification Search ........... 715/204; 707/706, 722, 724
See application file for complete search history.

(56) References Cited

U.S. PATENT DOCUMENTS

| | | | |
|---|---|---|---|
| 5,509,116 A * | 4/1996 | Hiraga et al. ............. 707/1 |
| 5,669,006 A * | 9/1997 | Joskowicz et al. ......... 715/202 |
| 5,802,514 A | 9/1998 | Huber | |
| 5,873,106 A * | 2/1999 | Joseph ................... 715/203 |
| 6,104,393 A | 8/2000 | Santos-Gomez | |
| 6,353,448 B1 * | 3/2002 | Scarborough et al. ...... 715/744 |
| 6,559,860 B1 * | 5/2003 | Hamilton et al. .......... 715/700 |
| 6,901,554 B1 * | 5/2005 | Bahrs et al. ............. 715/526 |
| 6,938,041 B1 * | 8/2005 | Brandow et al. .......... 707/10 |
| 7,181,686 B1 * | 2/2007 | Bahrs .................... 715/526 |
| 2002/0116418 A1 * | 8/2002 | Lachhwani et al. ........ 707/517 |
| 2002/0118193 A1 * | 8/2002 | Halstead, Jr. ........... 345/440 |

* cited by examiner

*Primary Examiner* — Apu Mofiz
*Assistant Examiner* — Jared Bibbee
(74) *Attorney, Agent, or Firm* — King & Spalding L.L.P.

(57) ABSTRACT

The invention relates to a method for controlling the disposition of graphical elements, whose positioning is effected by a layout manager component, according to which the elements are listed in tuples according to a predetermined method. A Boolean condition is evaluated for every tuple and if said Boolean condition is met an associated command is carried out that comprises the control command for the layout manager component. The inventive method is preferably used in generator systems for generating applications that extract data bases, whereby for every line of the result table graphical objects are generated and said objects are disposed on the graphical surface by way of the indicated method.

8 Claims, 2 Drawing Sheets

```
10.  import java.awt.*;
11.  import java.awt.event.*;
12.  import java.util.*;
13.  public class Layouter extends Frame {
14.      public Layouter() {
15.          setLayout(new BorderLayout());
16.      }
17.      boolean constraint1(aPanel x, aPanel y) {
18.          return x.getNumber() == y.getCallee();
19.      }
20.      void arrange1(aPanel x, aPanel y) {
21.          x.intoPanel(y);
22.      }
23.      boolean constraint2(Layouter x, aPanel y) {
24.          return y.getCallee() == "";
25.      }
26.      void arrange2(Layouter l, aPanel y) {
27.          l.add(y);
28.      }
29.      void doArrange(Vector theData) {
30.          Enumeration x = theData.elements();
31.          while (x.hasMoreElements()) {
32.              aPanel xx = (aPanel) x.nextElement();
33.              Enumeration y = theData.elements();
34.              while (y.hasMoreElements()) {
35.                  aPanel yy = (aPanel) y.nextElement();
36.                  if (constraint1( xx, yy))  { arrange1(xx, yy); }
37.                  if (constraint2( this, yy)) { arrange2(this, yy); }
38.              }
39.          }
40.      }
41.  public static void createData(Vector theData) {
42.          theData.addElement(new aPanel("Anton",  "111", "666"));
43.          theData.addElement(new aPanel("Berta",  "222", "666"));
44.          theData.addElement(new aPanel("Caesar", "333", ""));
45.          theData.addElement(new aPanel("Dora",   "444", "111"));
46.          theData.addElement(new aPanel("Emil",   "555", "111"));
47.          theData.addElement(new aPanel("Fritz",  "666", "333"));
48.          theData.addElement(new aPanel("Gustav", "777", "666"));
49.          theData.addElement(new aPanel("Hugo",   "888", "777"));
50.      }
51.  public static void main (String[] args) {
52.          Vector theData = new Vector();
53.          createData(theData);
54.          Layouter mywin = new Layouter();
55.          mywin.doArrange(theData);
56.          mywin.pack();
57.          mywin.setVisible(true);
58.      }
59.  }
```

```
10.  import java.awt.*;
11.  import java.awt.event.*;
12.  import java.util.*;
13.  public class Layouter extends Frame {
14.      public Layouter() {
15.          setLayout(new BorderLayout());
16.      }
17.      boolean constraint1(aPanel x, aPanel y) {
18.          return x.getNumber() == y.getCallee();
19.      }
20.      void arrange1(aPanel x, aPanel y) {
21.          x.intoPanel(y);
22.      }
23.      boolean constraint2(Layouter x, aPanel y) {
24.          return y.getCallee() == "";
25.      }
26.      void arrange2(Layouter l, aPanel y) {
27.          l.add(y);
28.      }
29.      void doArrange(Vector theData) {
30.          Enumeration x = theData.elements();
31.          while (x.hasMoreElements()) {
32.              aPanel xx = (aPanel) x.nextElement();
33.              Enumeration y = theData.elements();
34.              while (y.hasMoreElements()) {
35.                  aPanel yy = (aPanel) y.nextElement();
36.                  if (constraint1( xx, yy))   { arrange1(xx, yy); }
37.                  if (constraint2( this, yy)) { arrange2(this, yy); }
38.              }
39.          }
40.      }
41.  public static void createData(Vector theData) {
42.          theData.addElement(new aPanel("Anton",   "111", "666"));
43.          theData.addElement(new aPanel("Berta",   "222", "666"));
44.          theData.addElement(new aPanel("Caesar",  "333", ""));
45.          theData.addElement(new aPanel("Dora",    "444", "111"));
46.          theData.addElement(new aPanel("Emil",    "555", "111"));
47.          theData.addElement(new aPanel("Fritz",   "666", "333"));
48.          theData.addElement(new aPanel("Gustav",  "777", "666"));
49.          theData.addElement(new aPanel("Hugo",    "888", "777"));
50.      }
51.  public static void main (String[] args) {
52.          Vector theData = new Vector();
53.          createData(theData);
54.          Layouter mywin = new Layouter();
55.          mywin.doArrange(theData);
56.          mywin.pack();
57.          mywin.setVisible(true);
58.      }
59.  }
```

Fig. 1

```
80. import java.awt.*;
81. public class aPanel extends Panel {
82.     private String myNumber = new String();
83.     private String hisNumber = new String();
84.     private Panel subPanel = new Panel();
85.     public aPanel(String who, String myTel, String calledFrom) {
86.         myNumber = myTel;
87.         hisNumber = calledFrom;
88.         setLayout(new BorderLayout());
89.         add(new Button(who+" ("+myTel+")"), BorderLayout.NORTH);
90.         subPanel.setLayout(new GridLayout(1,0));
91.         add(subPanel, BorderLayout.CENTER);
92.     }
93.     public void intoPanel(aPanel x)  { subPanel.add(x); }
94.     public String getCallee()        { return hisNumber; }
95.     public String getNumber()        { return myNumber; }
96. }
```

Fig. 2

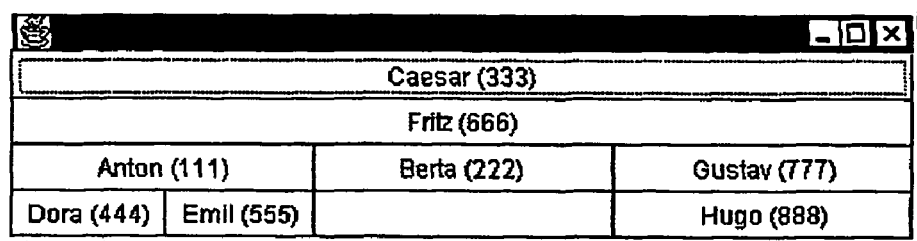

Fig. 3

CONTROL METHOD FOR DISPOSING GRAPHICAL ELEMENTS

CLAIM FOR PRIORITY

This application claims priority to PCT/DE01/04883, published in the German language on Jul. 11, 2002, which claims benefit to German application No. 100 65 323.5, filed in the German language on Dec. 31, 2000.

TECHNICAL FIELD OF THE INVENTION

The invention relates to the control of user interfaces having graphical elements ("graphical user interface," GUI).

BACKGROUND OF THE INVENTION

A number of tools are available for the creation of programs having a graphical interface, which facilitate the creation of such programs.

An example is the compiler system 'Delphi' of the Inprise company (formerly Borland). In this system, the user places objects of the graphical interface onto a working interface, and assigns properties to them. The classes of these objects are referred to as components in Delphi. The position of the objects is noted by the interface of the compiler system and is filed in resource files. In this way, the objects are predetermined by their position. While it is certainly possible to change the position during the running time, this requires that pixel coordinates be indicated and is therefore complicated.

Such a dynamic adaptation is required, for example, if database inquiries must be represented, the scope of which is only known during the running time after the database query. For this purpose, special components are provided in Delphi, which allow representation of all calculated data in the form of a table, for example. While the properties of the representation can be parameterized, this can only normally be done only within the scope of the planned representation. These planned representations are of a text type and correspond to forms and tabular representations. If another representation is desired, particularly one that visualizes the relationship between the data, either a new specific component has to be created, or the entire graphical configuration must be specially programmed. Either one requires significant, detailed knowledge and is initially unknown to a newcomer to such a system, and is therefore also time-consuming for an expert.

U.S. Pat. No. 5,802,514 presents a system for the representation of database contents that generates a form-oriented representation.

U.S. Pat. No. 6,104,393 shows a system for the integration of procedural and object-oriented user interfaces in which also a representation with forms is selected.

Other tools that were created in the UNIX environment are the programming language JAVA and the Tcl/Tk system. In both, partial systems referred to as 'layout managers' are used. In this environment, the displayed graphical objects are also referred to as 'widgets' in order to clearly differentiate them from the objects of the programming language. A layout manager arranges objects of the programming language that have been assigned a graphical representation on an interface, if it is displayed or if it has changed in size or in any other way. The graphical objects are made known to the layout manager object, whereby influence can be exerted on their position by way of parameters, without absolute pixel positions being necessary. If the number of objects is predetermined, i.e. if it is fixed during the programming, this procedure works well.

However, if the objects are generated dynamically, and if they are not predetermined, then each case requires a special solution specific to the case.

SUMMARY OF THE INVENTION

The present invention provides a method with which the disposition of widgets can be easily and reliably controlled without detailed programming being required. The method is particularly makes the visual representation of database queries simple, and is suitable for integration into a visual program generator interface.

In one embodiment of the invention, the widgets are first created as objects and then, during transfer of the objects to a layout manager, a set of rules determines the parameters of the objects and their position. These rules are compiled in a table and then either processed interpretatively or translated into corresponding program code.

The table includes two parts: a condition and an action. In each instance a pair of objects is checked with regard to the condition and, if applicable, is made known to the layout manager in accordance with the action. This is explained in greater detail below by way of an example. It then turns out that it is easy to add rules for a reaction to user actions.

In another embodiment of the invention, there is a method for controlling the disposition of graphical elements, whose positioning is effected by a layout manager component and according to which the elements are listed in tuples according to a predetermined method, and a Boolean condition is evaluated for each tuple and, if the Boolean condition is met, an associated command is carried out that comprises the control commands for the layout manager component. The method is preferably used in generator systems for generating applications that query databases, whereby graphical objects are generated for every line of the result tables and arranged on the graphical interface by way of the indicated method.

BRIEF DESCRIPTION OF THE DRAWINGS

The drawings show:

FIGS. 1 and 2 show two class definitions in Java, which represent an example of the invention.

FIG. 3 shows a result that occurs during implementation.

DETAILED DESCRIPTION OF THE INVENTION

The invention will be explained in the following, using a simplified example. For this example, the programming language JAVA will be used, Version 1.1.6 in the example. The line numbers indicated in FIGS. 1 and 2 do not belong to the program text but serve only for reference.

The example relates to a telephone chain in which one subscriber in turn calls one or more other subscribers. For this purpose, a data structure in the form of a table is used, which will be presented more precisely below, and in which the name of a subscriber is linked to his own telephone number and to the telephone number of the person who is supposed to call him.

FIG. 1 shows the "layouter" class, which fills a screen region with graphical objects and whose implementation produces the result shown in FIG. 3. In this example, the graphical objects are all of the class "aPanel," which is listed in FIG. 2. Here, the class "aPanel" includes the constructor in lines 85 to 92 and three access functions in lines 93 to 95.

The constructor of "aPanel" is derived from the class 'Panel' and furthermore defines three variables. Two character chains, for example telephone numbers, are stored in the variables "myNumber" and "hisNumber" in lines 82 and 83. Furthermore, another "Panel" is used, which is nested in the panel of the class "aPanel."

The constructor has three parameters, namely "who," "myTel" and "calledFrom," as indicated in line 85. These parameters correspond to the columns of the table that defines the data. The constructor is used in lines 42 to 49 of FIG. 1, in which eight instances of "aPanel" are generated.

The second and third parameters are stored in a variable each in lines 86 and 87. These can be queried by way of the functions "getCallee" and "getNumber" in lines 94 and 95. A "BorderLayout" is established in line 88 as layout manager. A layout manager arranges a number of graphical objects within a region, a "Panel" in this case, in that first the relative position of the objects is indicated, and later these objects are positioned by the layout manager. Layout managers are an integral part of the interface programming by the "JAVA AWT" and are therefore described in many publications. They are also present, in similar form, in the programming environment "Tcl/TK" and can therefore be assumed to be part of basic knowledge and to be generally known. As a rule, a nested hierarchy of specific layout managers is used, which in its entirety is also referred to as layout manager.

A "BorderLayout" makes it possible to add graphical objects to the "Panel" and thereby indicate whether they are to be arranged at the top, referred to as "NORTH," or in the middle, referred to as "CENTER." Accordingly, an object "Button" is arranged in line 89, at the top, in the panel of the object "aPanel" that is being instanced. The object "Button" was selected for this example because such an object usually has a frame and can therefore be easily distinguished in the panel. The event control that is possible with a button is not used in this example. The labeling of the 'Button' contains the name and the related telephone number, as given by the first and second parameter of the constructor.

Then, in line 90, another layout manager, namely a "GridLayout," is assigned to the panel generated in line 84. In line 91, this panel is made known to the layout manager "BorderLayout" as the center ("CENTER"). This subordinate "Panel," called "subPanel," is not filled yet; the invention uses a method described further below for this purpose.

In other words, with the class "aPanel" a region is generated in which a header with name and telephone number, represented as a "Button," is present, below which a subordinate panel is given in which the objects for the persons to be called are to be represented.

At this point, it should be pointed out that in the case of programming according to the state of the art, the tree structure described by the table would be copied first, and would then generate the objects from the leaves of the tree, in ascending order, so that the layout of the leaves of each node is already completed and can the be integrated into the layout of the next higher node. The invention leaves the linking of the objects open, for the time being, and uses its own method, which will be presented further below.

Let us now turn to the class "Layouter," which is presented in lines 10 to 59 in FIG. 1.

The class "Layouter" contains a static function "main" in lines 51 to 58, which thereby can be called up as an "application." In line 52, a "Vector" called "theData" is generated, which will contain the data to be displayed. A vector aggregates a number of objects.

In line 53, a number of objects of the class "aPanel" is instanced by calling up the function "createData" and stored in the vector "theData." Here, this function stands in for the fact that a number of non-predetermined graphical objects are generated, the disposition of which is the content of the invention. As a rule, a database query, for example of a relational database, will be used for the purpose, in which a three-column table is determined for the example, and for each line an object of the class "aPanel" is generated that is given the column values as parameters. The large number of techniques available to a person skilled in the art for obtaining such data volumes are represented here by the function "createData" for the sake of simplicity. The example is also particularly simple in that only one table and only one class of objects are used.

Once the objects, which are generally not predetermined in terms of number and type, have been generated, then an instance of the class "Layouter" is generated in line 54. This class is derived from the class 'Frame' and thereby represents a (rectangular) frame in which the objects are supposed to be arranged by the invention. This is done in line 55 by calling up the function "doArrange," which will be presented more precisely below. The instancing in line 54 has called up the constructor in line 14 to 16 which merely establishes a "BorderLayout" as the layout manager. This is the standard layout manager and is only explicitly mentioned here in order to make the structure stand out more clearly.

After the function "doArrange," which will be described below, has established the arrangement of the objects, the specified arrangement is set by the layout manager in line 56 by means of the 'pack' function inherited from the class, and made visible by line 57, so that the result according to FIG. 3 becomes visible. The example does not list any of the elements for interaction, particularly an event handling for termination of the started application.

In the function "doArrange" in lines 29 to 40 all pairs of objects contained in the vector "theData" are now formed by two nested loops. For the sake of simplicity, the two variables "xx" and "yy" are used for the purpose, which are already of the type of the only class "aPanel" in the example.

The core of the function "doArrange" are the lines 36 and 37, in which first a Boolean function 'constraint1' (lines 17-19) and "constraint2" (lines 23-25) respectively is called up for each pair (xx, yy). If these functions yield 'true,' then the function "arrange1" (lines 20-22) and "arrange2" (lines 26-28), respectively, are called up.

In the process the "constraint" functions check whether or not the dependent "arrange" function is to be applied. In the example, in "constraint1" the number of one party ("xx") is compared with the number of the calling party ("yy"). If the numbers are the same, then "xx" must be arranged as to be called by "yy." This is done by the function "arrange1" by calling up the class function "intoPanel," by means of which the object "yy" is entered in the subpanel "subPanel" of the object "xx."

The same technique is used for entering the origin of the telephone chain into the "Frame" of the comprehensive object "mywin." Here, the condition formulated by "constraint2" is that the subscribers who are not being called by anybody are entered there by "arrange2." In the example it is only one subscriber, i.e., one object. The example uses the robust functionality of the JAVA AWT because "arrange2" is called up multiple times with identical parameters. In an optimized version, line 37 would be moved behind line 33.

Lines 36 and 37, in combination with the function definitions of the functions that are called up, represent the code generation for the following table:

| 01 | 02 | Condition | Action |
|---|---|---|---|
| x | y | x.Number == y.Callee | x.intoPanel(y) |
| l | x | x.Callee == "" | l.add(x) |

In the first two columns, the objects 01 and 02 are listed, which are used as parameters in the other columns. In the third column, a condition is listed, and if this condition is met, the action of the fourth column is performed. In the example, the table was implemented as code in lines 17 to 40. Alternatively, the table can be presented as a table and processed interpretatively.

In practical use of the invention, more than two classes of objects will almost always have to be represented. In this case also the class of the object is listed in the first two columns. For our example, the table would then read:

| 01 | 02 | Condition | Action |
|---|---|---|---|
| aPanel:x | aPanel:y | x.Number == y.Callee | x.intoPanel(y) |
| Layouter:l | aPanel:x | x.Callee == "" | l.add(x) |

This representation is equivalent to a form in which the condition is an AND link between two preconditions that determine the class of the parameters, and the actual condition. The latter form, however, is better suited for optimizations. Such an optimization includes setting up a separate vector for each class in which the objects of the class are aggregated. The pair-forming loop in which the condition is tested then only needs to list the objects of the respective vector. Moreover, the optimization in which line 37 is moved ahead of line 34 as mentioned above occurs automatically.

In contrast to the objects, the table is predefined, i.e. not dependent on the database contents, if the data are obtained from a database.

Preferably, the invention is used in generator systems for applications by means of which database contents are to be visualized. In such a system, the user first creates the database queries, for example in the form of SELECT commands of a relational database. The system determines the number and the type of the columns by way of a structure query. In the systems known until now, such as the Delphi system mentioned above, graphical objects are assigned at this stage. These can be assigned to the entire query result, in most cases in the form of a table/text representation. They can also be assigned to a line that is determined by way of a (visible or invisible) navigator. In the process each graphical object in the generator system stands for an instancing of the related class to be established at run time; the number of instances is therefore predetermined at the time of creation.

When using the invention, on the other hand, a class is assigned in the simplest case to one line of a result table, and an object of the class is then instanced for every line at run time. In the generator system, an object is then created for every class, and shown as prototypes on the graphical interface, so that the user can input the link between the objects. The input links are stored in a table as shown above until the generator system generates the application, and then preferably implemented as commands of the related programming language, creating thereby code similar to that in FIG. 1 and FIG. 2. Frequently two or more objects will be created in the process as prototypes in order to be able to show the relationship between them. This would have been a possible representation in the above example, in which an object of the class 'aPanel' is first provided with the header, then the rest is filled out by a panel, and another object of the class 'aPanel' is inserted into that panel. This procedure is recognized by the generator system and the question is asked as to the condition under which this placement is supposed to occur. The action itself is already determined by means of the 'drag-and-drop' operation in the generator system itself, if there is no multiple meaning for the columns used. In this connection it should be noted that in actual applications the method is preferably used for linking tables that are frequently referred to as a reference ('foreign key') in the terminology of databases. The above table would represent the second column as a key and the third column as a reference to the same table. In these cases the possible relationship of the objects is already predefined by way of the database structure.

In the example and in most cases of use, pairs of objects are formed, checked with regard to a condition and, if applicable, passed to an action. However, it is certainly possible to form only individual objects or triples or other n-tuples. In the above example the higher container (the layouter object) could just as well be viewed as global variable, and therefore the second line of the table would have to be applied not to pairs of objects but instead only to all the objects one time. This is to be viewed as a preferred version. A use of triples or multidimensional n-tuples always makes sense if a layout manager permits such assignments.

In the example the objects were defined as "Button" for the sake of simplicity, so that the representation of the tree structure appears to be rather rough and awkward. Of course, the objects can also be represented as graphical symbols, permitting thereby significantly denser packing. An object can also contain a pictogram, which is selected in data-dependent manner. In addition, it is conceivable that several objects of different classes are generated from one line. Specifically in these cases it makes sense that the table shown above selects the class in the first two columns and thereby makes both the condition and the action dependent on the class of the object.

In a further development of the invention, not only the arrangement of the graphical objects is defined by means of a table, preferably translated into program code. Instead, the actions of the user, particularly those performed by drag and drop ('drag-and-drop'), are also specified. In the known generator systems the graphical objects are predetermined, so that the user of the systems programs the actions as methods that are assigned to the corresponding events. This is neither possible nor necessary when using the present invention.

However, here again a solution is presented by way of a rule/action table. Such a table could read:

| Drag | Drop | Action |
|---|---|---|
| aPanel:x | aPanel:y | y.setCallee(x.getNumber( )) |

This achieves the result that for every object "x" that is dragged to the object "y" and dropped there, the number "x" is stored as a new number of the calling party in the variable "hisNumber" (line 83). It will almost always be necessary to trigger a new structure of the display by means of a "redraw" message. Whether the action is now specified as a method of the 'drop' class or immediately as a database command 'UPDATE . . . ' is left up to a person skilled in the art when designing a corresponding generator system. Also, an expansion is possible, in which the table lists not only the types but also the type of event [sic]:

| Drag | Drop | Event | Action |
|---|---|---|---|
| aPanel:x | aPanel:y | drop | y.setCallee(x.getNumber( )) |

By means of the invention it is possible to generate one or more objects from every line of the result table. Their graphical arrangement is then established by prototypes, and the arrangement of the objects is, in the last analysis, only established during run time. The same method can be used for the behavior in connection with events.

What is claimed is:

1. A computer implemented method for controlling an arrangement of graphical objects representing database query results in a graphical user interface, whose positioning with respect to the graphical layout is effected by a layout manager component, the computer implemented method comprising:

querying a database and receiving a plurality of query results, each including data content;

after receiving the plurality of query results from the database, creating a graphical object corresponding to each query result, such that each graphical object is associated with the data content of the respective query result;

transferring the graphical objects corresponding to the database query results to the layout manager component and listing the graphical objects in a plurality of tuples according to a predetermined method;

for each listed tuple of graphical objects:
applying a predetermined Boolean condition to the data content associated with the individual graphical objects in the tuple to determine a display position of at least one of the graphical objects in the tuple relative to at least one other graphical object based at least on the result of the application of the predetermined Boolean condition;

wherein the determination of the relative display positions of each graphical object, which is based on the analysis of the data content associated with the graphical object tuples, defines a structure of a hierarchical graphic layout for displaying the graphical objects, the hierarchical graphic layout structure defining a number of nodes and sub-nodes, such that the hierarchical graphic layout structure, apart from the position of the graphical objects within the hierarchical layout, is not defined until determining the relative display positions of the graphical objects based on the analysis of the data content associated with the graphical object tuples; and displaying the graphical objects in the hierarchical graphic layout structure defined by the determined relative positions of the graphical objects.

2. The method according to claim 1, wherein a check is carried out before the Boolean condition is evaluated as to whether the components of the tuples of the conditional action correspond to classes assigned in advance.

3. The method according to claim 1, wherein at least one graphical object is generated for every line of a result table of the database query.

4. The method according to claim 1, further comprising:
assigning at least two Boolean conditions to the tuples concerning an occurrence of events relating to one or more particular graphical objects; and
assigning actions thereto that cause a change in data corresponding to the one or more particular graphical objects.

5. The method according to claim 4, wherein a change in the data comprises a command that changes the database.

6. The method according to claim 1, wherein the conditions are stored in a table.

7. The method according to claim 6, wherein the table is implemented as commands of a programming language.

8. A computer implemented method for controlling an arrangement of graphical objects representing database query results in a graphical user interface, whose positioning with respect to the graphical layout is effected by a layout manager component, the computer implemented method comprising:

querying a database and receiving a plurality of query results, each including data content;

after receiving the plurality of query results from the database, creating a graphical object corresponding to each query result, such that each graphical object is associated with the data content of the respective query result;

transferring the graphical objects corresponding to the database query results to the layout manager component and listing the graphical objects in a plurality of tuples according to a predetermined method, the layout manager comprising at least one of:
a border layout manager; and
a grid layout manager;

for each listed tuple of graphical objects:
applying a predetermined Boolean condition to the data content associated with the individual graphical objects in the tuple to determine a display position of at least one of the graphical objects in the tuple relative to at least one other graphical object based at least on the result of the application of the predetermined Boolean condition;

wherein the determination of the relative display positions of each graphical object, which is based on the analysis of the data content associated with the graphical object tuples, defines a structure of a hierarchical graphic layout for displaying the graphical objects, the hierarchical graphic layout structure defining a number of nodes and sub-nodes, such that the hierarchical graphic layout structure, apart from the position of the graphical objects within the hierarchical layout, is not defined until determining the relative display positions of the graphical objects based on the analysis of the data content associated with the graphical object tuples; and displaying the graphical objects in the hierarchical graphic layout structure defined by the determined relative positions of the graphical objects.

* * * * *